Sept. 1, 1925.

F. A. McDONALD

FLEXIBLE NOZZLE

Filed April 17, 1924

1,551,893

INVENTOR.
FRANK A. McDONALD
BY
ATTORNEYS.

Patented Sept. 1, 1925.

1,551,893

UNITED STATES PATENT OFFICE.

FRANK A. McDONALD, OF SAN FRANCISCO, CALIFORNIA.

FLEXIBLE NOZZLE.

Application filed April 17, 1924. Serial No. 707,235.

*To all whom it may concern:*

Be it known that I, FRANK A. MCDONALD, a citizen of the United States, and a resident of San Francisco, county of San Francisco, State of California, have invented a new and useful Flexible Nozzle, of which the following is a specification.

This invention relates to pipe nozzles as used for guiding liquids from a pipe or hose line into various receptacles, and particularly to flexible nozzles as used for guiding of gasoline or oil into the tanks as found on modern motor vehicles.

The particular objects of my invention are to provide a nozzle particularly adapted for insertion into the filling opening of an automobile tank and which will possess a limited degree of flexibility yet be proof against falling out of the tank filling opening, or accidental withdrawal.

The danger of fire and explosion upon the slipping out of the filling hose nozzle from the gasoline tank of an automobile is well known, and since it is desirable that such filling nozzles on gasoline hose should be flexible in order to easily meet all conditions met with in filling various cars, it follows that the danger of slipping out is increased, as a flexible nozzle does not so readily stay in place when inserted into the car tank.

My invention overcomes the danger alluded to and achieves the objects outlined above by having a device or devices to engage the edges of the filling opening of the can.

In the drawings accompanying this specification two modifications of my invention are shown.

In the form shown, the construction of my nozzle comprises a short length of flexible metal hose (1) with a ferrule (2) surrounding and soldered to the discharge end, and a coupling (3) surrounding and soldered to the other end.

This coupling is preferably adapted for screwing to the standard hose connection as found on the filling hose at gasoline stations and is provided with a hook (4) for hanging up the hose after using.

Figure 1:
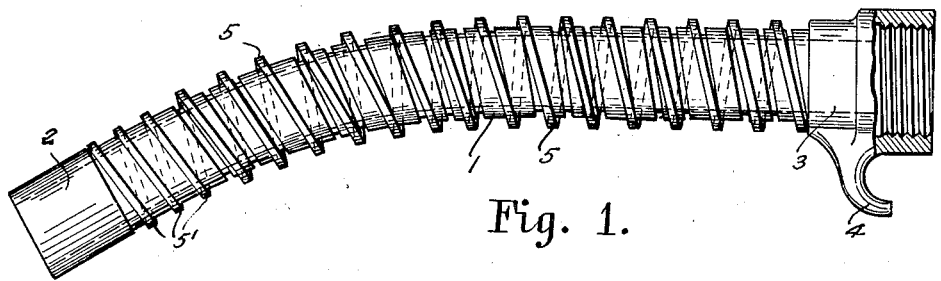
Figure 1 shows my flexible nozzle made with a spiral of wire surrounding it to provide a plurality of retention ridges to act against the edges of the can opening.

In Figure 1 the retention ridges referred to are formed of a heavy wire (5) spiralled loosely around the flexible metal hose for a portion of its length and soldered or otherwise secured to it at one or both ends. My preferred method of securing the wire spiral or spring is to have two or three coils (5') at the ends of reduced diameter and of a pitch to fit tightly within the spiral grooves of the flexible metal hose and soldered thereto. This may of course be done at both ends.

Figure 3:
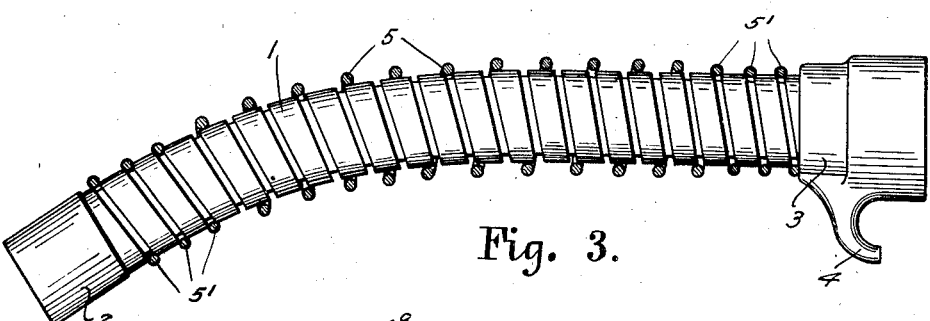
Figure 3 shows one of my nozzles with a round wire spiral guard drawn in section to show its relation to the spirals of the flexible metal hose of which my nozzle is constructed.

Figure 3 shows the spring in cross section and the flexible hose in full to clearly illustrate the seating of the end coils in the hose grooves.

It should be noted that the wire shown in Figure 1 is of square section to better engage the edges of the gasoline tank opening, but in Figure 3 a round wire is shown.

Figure 2:
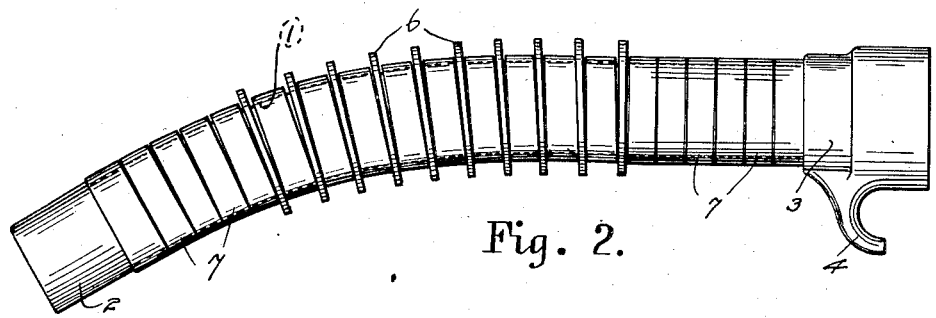
Figure 2 shows a similar nozzle but with the retention ridges formed of loose disks or washers spaced over the nozzle for a short distance.

In Figure 2 a different method of applying the retention edges is shown and consists in simply spacing a few loose rings or washers (6) along the hose by a few loose ferrules (7). The rings and ferrules are loose so as not to interfere with the flexing of the hose, though it is of course evident that each washer could be formed integral with its adjacent ferrule if desired or spacedly soldered to the hose, but the method of loosely slipping the washers and ferrules over the hose is the simplest.

The operation of the forms shown is the same, the nozzle is simply shoved into the filling opening of the gas tank, entering a portion of the wire coils (5) or washers (6) and whereupon they engage the edges of the tank opening and make it impossible for the nozzle to slip out.

The spiral spring form also functions to prevent the metal hose from becoming too wiggley through long use.

Figure 4:
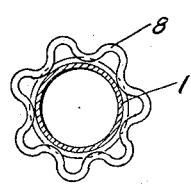
Figure 4 shows in section a crimped wire around the nozzle.

While I show the invention as applied to a flexible metal hose nozzle, it may also be applied to a rigid or solid metal nozzle as ordinarily used, with equally beneficial results. The crimping of the wire as shown at (8) in Figure 4 may be used in any of the wire coils shown to provide additional retaining edges if desired.

I claim:

1. A nozzle of the character described, comprising a section of flexible metal hose having an auxiliary series of spaced elements thereover projecting substantially from the hose structure and adapted to engage the edge of an opening into which the hose is inserted.

2. A nozzle of the character described, comprising a section of flexible metal hose having an open coil spiral spring thereover adapted to engage the edge of an opening into which it is inserted.

3. A nozzle of the character described, comprising a section of flexible metal hose having a wire spiralled in spaced coils around the outside of the metal hose and secured at one end thereto.

4. A nozzle of the character described, comprising a section of flexible metal hose having a wire spiralled in spaced coils around the outside of the metal hose and secured at both ends thereto.

5. A nozzle of the character described comprising a section of flexible metal hose with a ferrule secured to the outlet end and a hose coupling secured to the other end and an open coil spiral spring surrounding the metal hose and secured thereto at one end, said spring being made of wire having a square cross section.

6. A nozzle of the character described comprising a section of spirally wound flexible metal hose with a ferrule secured to the outlet end and a hose coupling secured to the other end, a wire spiralled around the outside of the hose with the end spiral made to fit tightly into the spiral grooves of the hose and being soldered thereto.

7. A nozzle of the character described comprising a section of flexible metal hose with a ferrule secured to the outlet end and a hose coupling secured to the other end and an open coil spiral spring surrounding the metal hose and secured thereto at one end, said spring being made of wire having a square cross section, and terminating at a point spaced from the ferrule.

8. A pipe nozzle having a wire spiralled around the outside thereof in open coils and secured at one end thereto.

FRANK A. McDONALD.